United States Patent
Takano

(10) Patent No.: US 12,532,157 B2
(45) Date of Patent: Jan. 20, 2026

(54) MANAGEMENT APPARATUS AND SUBSCRIBER INFORMATION SYNCHRONIZATION METHOD

(71) Applicant: SONY GROUP CORPORATION, Tokyo (JP)

(72) Inventor: Hiroaki Takano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 554 days.

(21) Appl. No.: 17/756,082

(22) PCT Filed: Nov. 11, 2020

(86) PCT No.: PCT/JP2020/042154
§ 371 (c)(1),
(2) Date: May 16, 2022

(87) PCT Pub. No.: WO2021/100577
PCT Pub. Date: May 27, 2021

(65) Prior Publication Data
US 2022/0408239 A1  Dec. 22, 2022

(30) Foreign Application Priority Data
Nov. 22, 2019  (JP) .................................. 2019-211495

(51) Int. Cl.
*H04W 8/20* (2009.01)
*H04W 8/04* (2009.01)
*H04W 8/18* (2009.01)

(52) U.S. Cl.
CPC ............... *H04W 8/20* (2013.01); *H04W 8/04* (2013.01); *H04W 8/183* (2013.01)

(58) Field of Classification Search
CPC .......... H04W 8/20; H04W 8/24; H04W 8/184
See application file for complete search history.

(56) References Cited

U.S. PATENT DOCUMENTS 6,181,939 B1   1/2001  Ahvenainen
2009/0149195 A1   6/2009  Zhu
(Continued)

FOREIGN PATENT DOCUMENTS

EP   3316556 A1   5/2018
JP   2009-544199 A   12/2009
(Continued)

OTHER PUBLICATIONS

International Search Report and Written Opinion of PCT Application No. PCT/JP2020/042154, issued on Dec. 8, 2020, 10 pages of ISRWO.

*Primary Examiner* — Sulaiman Nooristany
(74) *Attorney, Agent, or Firm* — CHIP LAW GROUP

(57) ABSTRACT

There is provided a management apparatus which includes a storage unit and a control unit where the storage unit stores, for each subscriber, storage destination information indicating a core network in which subscriber information of the subscriber is stored. The control unit designates a subscriber and a core network, and receives an instruction of a copy of the subscriber information. When receiving the instruction of the copy, the control unit specifies a core network in which the subscriber information of the designated subscriber is stored from the storage destination information. The control unit performs control to copy the subscriber information of the designated subscriber from an HSS of the specified core network to an HSS of the designated core network.

7 Claims, 13 Drawing Sheets

(56) References Cited

U.S. PATENT DOCUMENTS

2018/0124594 A1* 5/2018 Kelly ................... H04W 64/00
2019/0387065 A1* 12/2019 Lau ....................... G06F 16/162

FOREIGN PATENT DOCUMENTS

| JP | 2019-004277 A | 1/2019 | | |
|----|---------------|--------|---|---|
| WO | 1999/043175 A1 | 8/1999 | | |
| WO | WO-2015029945 A1 * | 3/2015 | ........... | H04L 9/0844 |

* cited by examiner

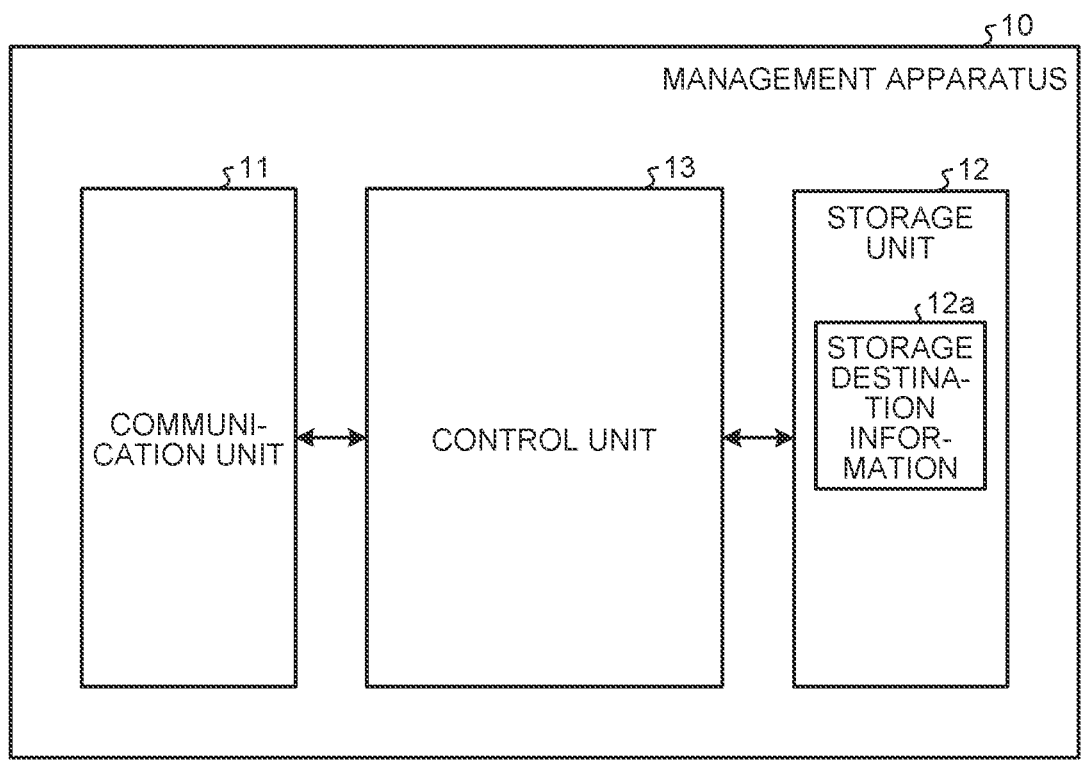

| CN ID | Location | Level |
|---|---|---|
| 1 | real location (1) | 0 |
| 2 | real location (2) | 0 |
| 3 | real location (3) | 1 |
| 4 | real location (4) | 2 |

FIG.14

| IMSI | ID1 | Location1 | Location2 | Location3 |
|---|---|---|---|---|
| 1 | Y | CN (1) = Center, real location (1) | | |
| 2 | X | CN (1), real location (1) | CN (2), real location (2) | |
| 3 | Z | CN (1), real location (1) | CN (2), real location (2) | CN (3), real location (3) |

12a

MANAGEMENT APPARATUS AND SUBSCRIBER INFORMATION SYNCHRONIZATION METHOD

CROSS REFERENCE TO RELATED APPLICATIONS

This application is a U.S. National Phase of International Patent Application No. PCT/JP2020/042154 filed on Nov. 11, 2020, which claims priority benefit of Japanese Patent Application No. JP 2019-211495 filed in the Japan Patent Office on Nov. 22, 2019. Each of the above-referenced applications is hereby incorporated herein by reference in its entirety.

FIELD

The present disclosure relates to a management apparatus and a subscriber information synchronization method.

BACKGROUND

Patent Literature 1 discloses a technique that enables a change of subscriber data managed by a subscriber server (for example, a home subscriber system (HSS)) disposed in a core network from the outside of the core network.

CITATION LIST

Patent Literature

Patent Literature 1: JP 2019-4277 A

SUMMARY

Technical Problem

In a cellular network, it is predicted that a plurality of core networks is distributed and arranged.

However, in the prior art, when the plurality of core networks is arranged, it is difficult to synchronize subscriber information with HSSs of the plurality of core networks.

Therefore, the present disclosure proposes a management apparatus and a subscriber information synchronization method capable of synchronizing subscriber information in HSSs of a plurality of core networks.

Solution to Problem

A management apparatus according to an embodiment of the present disclosure includes; a communication unit capable of communicating with a plurality of core networks provided in a cellular network; a storage unit that stores, for each subscriber, storage destination information indicating a core network in which subscriber information of the subscriber is stored; and a control unit that designates a subscriber and a core network to receive an instruction of a copy of subscriber information, specifies a core network in which the subscriber information of the designated subscriber is stored from the storage destination information, and performs control to copy the subscriber information of the designated subscriber from a home subscriber system (HSS) of the specified core network to an HSS of the designated core network.

BRIEF DESCRIPTION OF DRAWINGS

FIG. 4 is a diagram illustrating a configuration example of a management apparatus according to the first embodiment.

FIG. 5 is a diagram illustrating an example of a data configuration of storage destination information according to the first embodiment.

FIG. 14 is a diagram illustrating an example of a data configuration of storage destination information according to a fourth embodiment.

DESCRIPTION OF EMBODIMENTS

Figure 1:
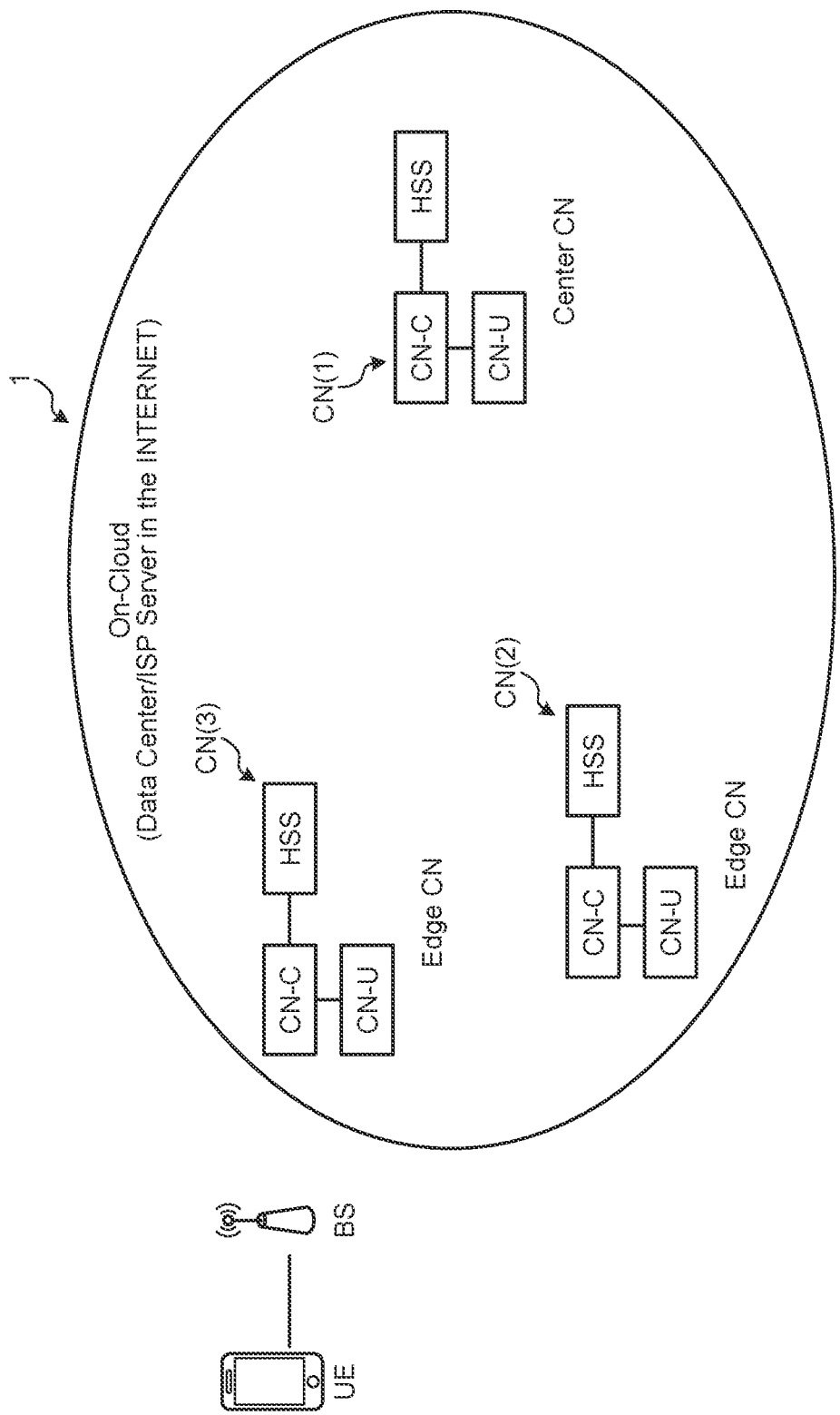
FIG. 1 is a diagram schematically illustrating an example of a cellular network.

Hereinafter, embodiments of the present disclosure will be described in detail with reference to the drawings. Note that, in each of the following embodiments, the same parts are denoted by the same reference signs, and redundant description will be omitted.

The present disclosure will be described according to the following order of items shown below.

1. Introduction
1-1. Cellular network
1-2. Mobile Edge computing and CN local arrangement
1-3. Necessity of synchronizing subscriber information
1-4. Roaming
1-5. About eSIM
1-6. Problems of prior art
2. First Embodiment
2-1. Cellular network
2-2. Configuration of management apparatus
2-3. Operation of management apparatus
3. Second Embodiment
3-1. Operation of management apparatus
4. Third Embodiment
4-1. Configuration of management apparatus
4-2. Operation of management apparatus 5. Fourth Embodiment
5-1. Configuration of management apparatus
5-2. Operation of management apparatus
6. Modification example 1. Introduction <1-1. Cellular Network>

In the third generation partnership project (3GPP), radio access technologies such as long term evolution (LTE) and new radio (NR) have been studied and formulated. For example, in 3GPP T523.401, a technology related to a cellular network has been studied and formulated.

Note that the LTE includes LTE-Advanced (LTE-A), LTE-Advanced Pro (LTE-A Pro), and evolved universal terrestrial radio access (EUTRA). In addition, the NR includes a new radio access technology (NRAT) and further EUTRA (FEUTRA). Note that a single base station may manage a plurality of cells. In the following description, a cell corresponding to LTE is referred to as an LTE cell, and a cell corresponding to NR is referred to as an NR cell.

The NR is a radio access technology (RAT) of a next generation (fifth generation (5G)) of (fourth generation (4G)) LTE or the like. The NR is a radio access technology that can support various use cases including enhanced mobile broadband (eMBB), massive machine type communications (mMTC), and ultra-reliable and low latency communications (URLLC). The NR has been studied aiming at a technical framework corresponding to usage scenarios, requirement conditions, arrangement scenarios, and the like in these use cases. The NR includes a new radio access technology (NRAT) and further EUTRA (FEUTRA).

In addition, a terminal device (It is also referred to as a mobile station, a mobile station device, or a terminal.) connected to the cellular network may be referred to as user equipment (UE).

The cellular network includes a radio access network (RAN) and a core network (CN). The RAN is a radio system between a base station and a terminal. The CN mainly performs permission and session management when the terminal connects to the network. The CN also includes a Control Plan Function and a User Plane Function in the 4G and 5G. In the cellular network, various types of information regarding the UE such as subscriber information of the UE and information used for generating an encryption key are stored in a server functioning as a home subscriber system (HSS). Note that the HSS may also be referred to as a unified data management (UDM). Hereinafter, it is referred to as an HSS, but the same applies to a UDM.

The Control Plane Function obtains information such as subscriber information of the accessed UE from the HSS, and determines, by using the obtained subscriber information, whether the UE may connect to the network. In addition, the Control Plane Function generates an encryption key for encryption. A subscriber identity module (SIM) card is mounted in the UE. The SIM card stores a subscriber number called an international mobile subscriber identity (IMSI). In order for the UE to connect to the network, information of the UE associated with the subscriber number of the SIM card mounted in the UE needs to be stored in the HSS.

A function of a control plane (C-Plane) of the CN is required until the UE is connected to the network. In the case of the 4G, a mobility management function (MME) performs this role. When the UE connects to the network and transmits and receives data, the function of the U-Plane of the CN is required. In the case of the 4G, S-GW and P-GW perform this role.

In a 5G Core Network, an Entity having a role similar to that of the 4G is prepared. In the 5G, the roles of U-Plane of the S-GW and the P-GW are integrated into one entity called user plane function (UPF).

The 4G P-GW and the 5G UPF act as a gateway that is a boundary between the CN and the general Internet. When the CN is also arranged in the general Internet, a User plane Function of a Core Network called a CN-U corresponding to the P-GW or the UPF can be regarded as a gateway arranged at a boundary between the CN and a general application.

<1-2. Mobile Edge Computing and CN Local Arrangement>

Meanwhile, in the cellular network, it is predicted that a plurality of CNs is distributed and arranged. FIG. 1 is a diagram schematically illustrating an example of a cellular network. In a cellular network 1, a plurality of core networks (CNs) is arranged in a distributed manner. In FIG. 1, a plurality of three CN(1) to CN(3) is arranged.

Each CN includes a node (CN-C) of the Control Plane Function, and a node (CN-U) of the User plane Function. The CN-C is communicatively connected to the HSS, and determines whether the UE may connect to the network. The CN-U forwards user data between a packet data network (PDN) or a data network (DN) and the RAN.

In FIG. 1, the Core Network (CN(3)) is arranged near the UE and the base station (BS). As described above, it is known that when the Core Network is arranged near the UE and the base station (BS), a delay required in a cellular part such as the RAN is reduced. Therefore, it is expected that the number of Core Networks arranged in an Edge of the Internet will increase. In FIG. 1, two CN(2) and CN(3) are arranged as Edge Core Networks (Edge CNs) in the Edge of the Internet. It is convenient that a Center Core Network serving as a Master is arranged on the Internet in addition to the Core Networks arranged in the Edge. In FIG. 1, the CN(1) is arranged as the Center Core Network (Center CN). When the Core Network is not arranged in the Edge, management is performed using the Center CN. In the future, in a situation where the Center CN exists in this way, it is expected that a large number of Core Networks (CNs) are arranged in the Edge of the Internet in various places around the world.

<1-3. Necessity of Synchronizing Subscriber Information>

It can be ensured that UE information is stored in the HSS of the Center CN. However, it cannot be expected that information of a specific UE is stored in the HSSs of the Edge CNs distributed and arranged in the world. This is because the number of terminals in the world is enormous, and it is a security problem to copy all the information of the enormous number of terminals to the enormous number of the HSSs.

Conventionally, a technique called roaming is used to avoid such a problem. Details of the roaming will be described later. However, in a case where the number of CNs arranged in the Edge becomes enormous, it is considered that the roaming cannot be used. This is because the roaming requires a contract between operators, but it is conceivable that the number of operators becomes enormous in proportion to the number of the CNs arranged in the Edge. For this reason, it is considered that the contract-based roaming is inconvenient. Furthermore, for example, in a case where all the CNs in the Edge in the world use the HSS of the Center CN with a technique similar to the roaming, it is not desirable since a large number of control signaling occurs between the HSS of the Center CN and the Edge CN-C.

It is possible to reduce a delay until the setting is completed when the setting of the network is changed (change of QoS, addition of a session, or the like) by simply implementing all functions in the Edge CN. However, when the Edge CNs operated by a plurality of operators are mixed, connection to the Edge CNs of different operators is frequently performed. In this case, each time, the HSS of the Center CN is queried for subscriber information. If there is subscriber information in the Edge CN, it is desirable from the viewpoint of security when inquiries frequently occur to the HSS. Furthermore, in a case where an Edge CN for a factory or an office is arranged, it is preferable that subscriber information is stored in the Edge CN in terms of security.

<1-4. Roaming>

Here, roaming will be described. In the roaming, a terminal that attempts to connect to a Visited Network is checked whether the terminal is eligible to connect to the Visited Network by using an HSS of a Home Network. Then, setting is performed so that communication can be performed between the CN-U of the Visited Network, the terminal, and the base station. In order to do this, it is necessary for each Visited network to grasp which Home Network a SIM card mounted in the terminal belongs to. Further, operators of the Visited Network and the Home Network need to make a contract for the roaming. In a communication system using an enormous number of Edge Core Networks, it is difficult to make a contract for the roaming in advance, and thus, it is considered that the communication system cannot be applied.

Figure 2:
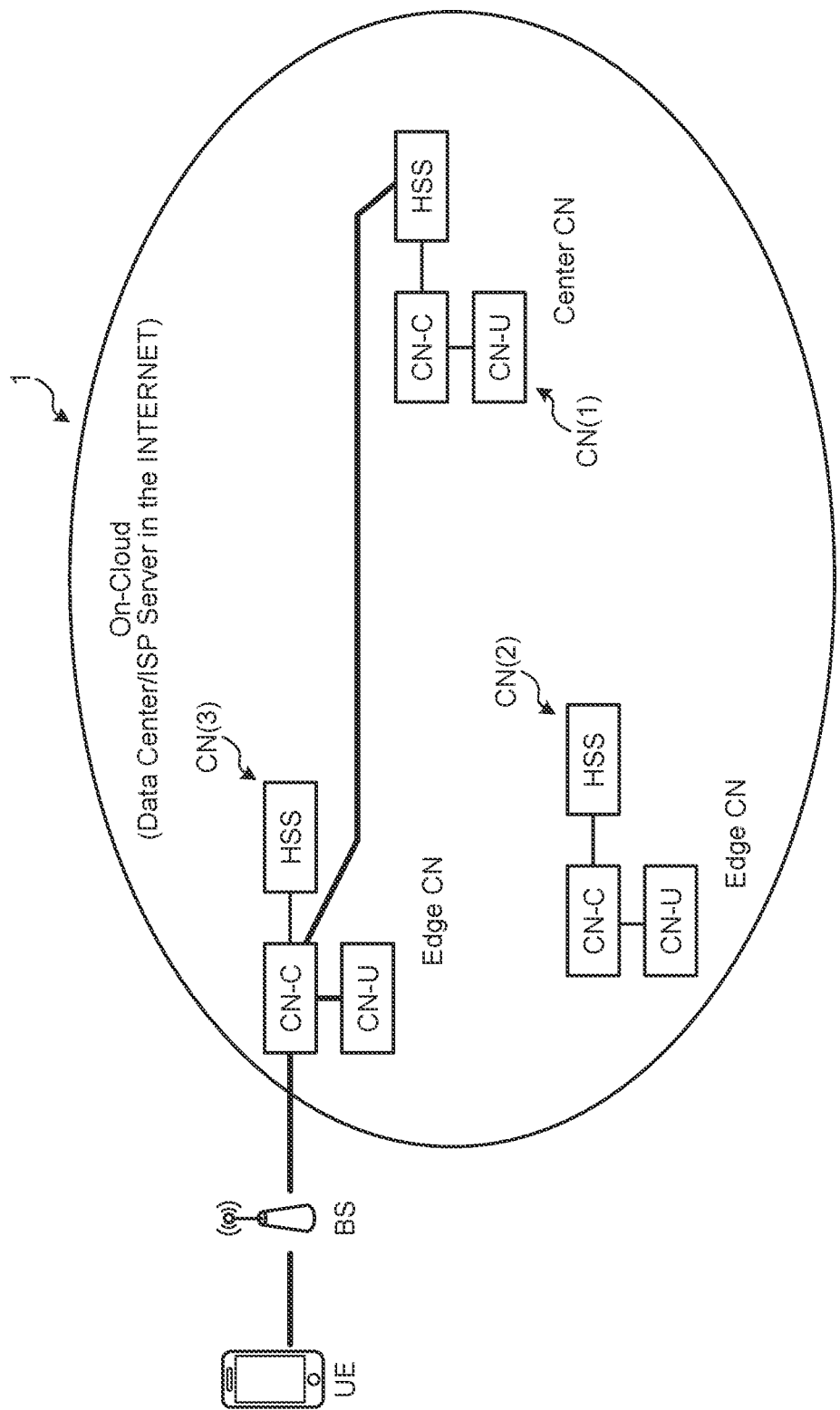
FIG. 2 is a diagram illustrating an example of prior art roaming.

FIG. 2 is a diagram illustrating an example of prior art roaming. In FIG. 2, a Center CN is, for example, an MNO, and subscriber information of a user of a terminal is stored in an HSS. An Edge CN has a roaming contract with the MNO. The Visited Network requested to be connected by the terminal obtains information from the HSS of the Center CN, which is a home network, by using a roaming technology. In FIG. 2, it should be noted that there are a plurality of HSSs. In the case of the roaming, it is not necessary to distribute the HSSs as described above, but since the contract is complicated, it is considered that the HSSs actually exist in a distributed manner as illustrated in FIG. 2.

<1-5. eSIM>

Here, an embedded subscriber identity module (eSIM) will be described. The eSIM is a technology capable of rewriting the contents of an SIM of UE. Even if an HSS of a CN to which the UE is to connect does not have information corresponding to the eSIM of the UE, the UE can connect to the network using the CN by writing to the eSIM of the UE information registered in the HSS of the CN to which the UE is to connect.

However, information needs to be downloaded to the eSIM by using another line such as Wi-Fi. In addition, terminals compatible with the eSIM need to spread all over the world. Therefore, it is necessary to provide a method of connecting to the Edge CN distributed in a manner other than the eSIM.

<1-6. Problems of Prior Art>

For example, there may be a case where the subscriber information of the user is not registered in the HSS of the core network (CN) connected to the locally arranged base station. In this case, conventionally, subscriber information is processed by using an HSS of a network called a home network as a master by roaming, and an entity that processes information of the HSS of the home network. This processing is typical processing of determining whether a subscriber has a right to connect to a network.

In order to use the roaming, it is necessary to make a contract between network operators. Therefore, when the number of operators is large, the contract becomes complicated, which is not realistic.

On the other hand, when a locally installed cellular system is managed by a single operator, it is predicted that a Core network is installed near a locally installed base station rather than preparing one Core network. This is because a delay between the terminal and the application can be reduced by installing the core network near the base station. In this case, it is not realistic to write subscriber information into local core networks around the world. This is because the number of the local core networks is expected to be enormous.

That is, in the prior art, when a plurality of core networks is arranged, it is difficult to synchronize subscriber information with HSSs of the plurality of core networks.

2. First Embodiment

<2-1. Cellular Network>

Figure 3:
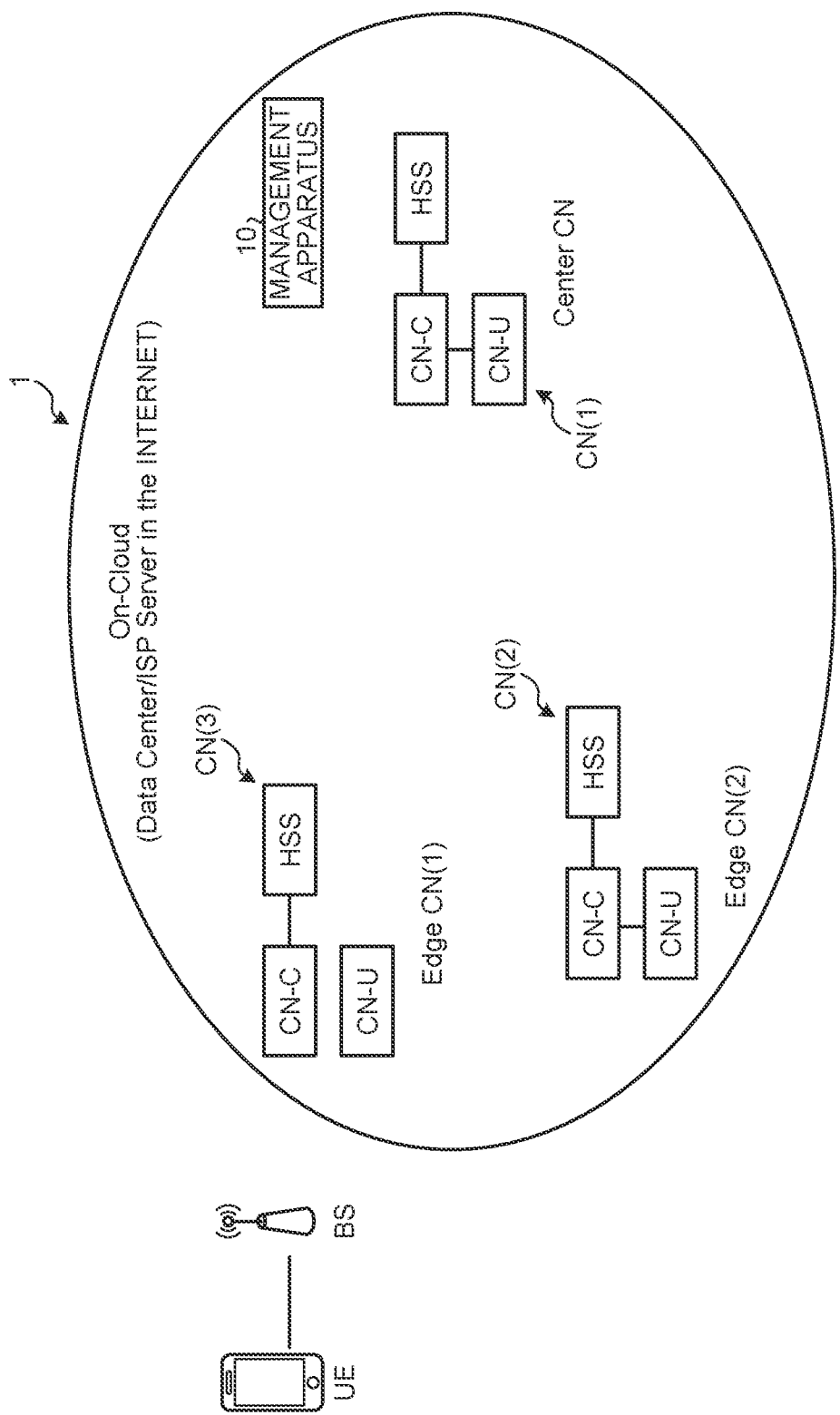
FIG. 3 is a diagram schematically illustrating an example of a cellular network according to a first embodiment.

Therefore, in a first embodiment, a management apparatus 10 described below is installed in a cellular network 1. FIG. 3 is a diagram schematically illustrating an example of a cellular network according to the first embodiment. In the cellular network 1 illustrated in FIG. 3, a plurality of three CN(1) to CN(3) is arranged as in FIG. 1. In addition, the management apparatus 10 is installed in the cellular network 1.

The management apparatus 10 is an entity that manages location information of each CN, and subscriber information of which subscriber is stored in an HSS of each CN. For example, the management apparatus 10 manages subscriber information corresponding to an IMSI.

The management apparatus 10 designates a subscriber to be copied, and a core network of a target serving as a copy destination, and receives an instruction of a copy of the subscriber information. When receiving the instruction of the copy, the management apparatus 10 specifies a core network in which the subscriber information of the designated subscriber is stored, and performs control to copy the subscriber information of the designated subscriber from an HSS of the specified core network to an HSS of the designated target core network.

<2-2. Configuration of Management Apparatus>

FIG. 4 is a diagram illustrating a configuration example of the management apparatus 10 according to the first embodiment. The management apparatus 10 is an apparatus that manages a wireless network. The management apparatus 10 includes a communication unit 11, a storage unit 12, and a control unit 13. Note that the configuration illustrated in FIG. 4 is a functional configuration, and hardware configuration may be different from the functional configuration. Furthermore, functions of the management apparatus 10 may be implemented in a distributed manner in a plurality of physically separated configurations. For example, the management apparatus 10 may include a plurality of server devices.

The communication unit 11 is a communication interface for communicating with other devices. The communication unit 11 may be a network interface or a device connection interface. For example, the communication unit 11 may be a local area network (LAN) interface such as a network interface card (NIC), or may be a universal serial bus (USB) interface including a USB host controller, a USB port, and the like. Furthermore, the communication unit 11 may be a wired interface or a wireless interface. The communication unit 11 functions as a communication means of the management apparatus 10. The communication unit 11 can communicate with a plurality of core networks provided in the cellular network 1.

The storage unit 12 is a data readable/writable storage device such as a dynamic random access memory (DRAM), a static random access memory (SRAM), a flash memory, or a hard disk. The storage unit 12 functions as a storage means of the management apparatus 10. The storage unit 12 stores various programs. Furthermore, the storage unit 12 stores various data. For example, the storage unit 12 stores storage destination information 12a.

The storage destination information 12a is data that stores a core network in which, for each subscriber, subscriber information of the subscriber is stored.

FIG. 5 is a diagram illustrating an example of a data configuration of the storage destination information 12a according to the first embodiment. The storage destination information 12a stores a core network in which, for each subscriber, subscriber information of the subscriber is stored. For example, in the storage destination information 12a, which CN the subscriber information is stored in is stored for each IMSI that identifies the subscriber. In the case of FIG. 5, in the IMSI"1", the subscriber information is stored in the HSS of the CN(1). The CN(1) is a Center CN. In IMSI"2", the subscriber information is stored in the HSSs of the CN(1) and the CN(2). In IMSI3, the subscriber information is stored in HSSs of HSSs of the CN(1), the CN(2), and the CN(3). Furthermore, the storage destination information 12a also stores information on the location of the CN together with the CN storing the subscriber information. The location information may be data indicating a location, may be an ID indicating a location, or may be information of an IP Address if a DNS (name resolution server) is prepared.

The control unit 13 is a controller that controls each unit of the management apparatus 10. The control unit 13 is realized by, for example, a processor such as a central processing unit (CPU) or a micro processing unit (MPU). For example, the control unit 13 is realized by the processor executing various programs stored in a storage device inside the management apparatus 10 using a random access memory (RAM) or the like as a work area. Note that the control unit 13 may be realized by an integrated circuit such as an application specific integrated circuit (ASIC) or a field programmable gate array (FPGA). Any of the CPU, the MPU, the ASIC, and the FPGA can be regarded as a controller.

The control unit 13 designates the subscriber and the core network, and receives an instruction to copy the subscriber information. When receiving the copy instruction, the control unit 13 specifies the core network in which the subscriber information of the designated subscriber is stored from the storage destination information 12a. The control unit 13 performs control to copy the subscriber information of the designated subscriber from an HSS of the specified core network to an HSS of the designated core network.

For example, the control unit 13 grasps which CN's HSS stores the subscriber information of each subscriber based on the storage destination information 12a. For example, in an initial state, the subscriber information of the IMSI exists only in the HSS of the Center CN. In the storage destination information 12a, the Center CN is stored as a storage destination of the subscriber information of each IMSI. The control unit 13 recognizes that the subscriber information corresponding to the IMSI is only in the Center CN based on the storage destination information 12a. The control unit 13 designates a copy target subscriber and a target core network serving as a copy destination, and receives an instruction to copy the subscriber information. When receiving the copy instruction, the control unit 13 controls to copy the subscriber information of the designated subscriber to the HSS of the designated target core network by repeating the operations of Step 1 to Step 6 described later.

Here, in a case where a large number of core networks are provided in the cellular network 1, a large number of core networks exist around the target core network although there is a difference in distance. Therein, there may be a plurality of core networks in which subscriber information of the designated subscriber is stored. In such a case, it is preferable to copy the subscriber information from the core network located near the target core network from the viewpoint of reducing the congestion of the entire network and the viewpoint of security.

Therefore, the control unit 13 specifies a core network closest to the designated core network from the core networks in which the subscriber information of the designated subscriber is stored. The control unit 13 performs control to copy the subscriber information of the designated subscriber from an HSS of the specified core network to an HSS of the designated core network.

For example, the storage destination information 12a also stores location information of the CN. The control unit 13 selects the HSS of the core network closest to the target core network as the copy destination from the core networks in which the subscriber information of the designated subscriber is stored based on the storage destination information 12a.

Here, the closeness between the CNs is a distance on the network, and is slightly different from an actual distance. For the most part, if an actual distance is close, a transmission delay between the CNs is considered to be small. Therefore, the control unit 13 may specify the core network closest to the designated core network by obtaining a distance in a pseudo manner by comparing the addresses of the networks.

On the other hand, in practice, the closeness between the CNs depends on which switch the CN and the CN are connected via. Therefore, a delay may be measured as the closeness between the CNs. For example, packet Internet groper (ping) can measure a round-trip delay. For example, a delay between a Target CN and each Source CN is obtained by pinging from the Target CN serving as a copy destination of the subscriber information to the Source CN serving as a copy source candidate of the subscriber information in which the subscriber information of the designated subscriber is stored. This means that the Source CN with the smallest delay is close to the Target CN. For example, when the CN is arranged in advance, the delay is obtained by pinging each CN or all other CNs estimated to be close to the arranged CN, and information on which CN is close to the CN is collected and notified to the management apparatus 10. The management apparatus 10 may store the notified inter-CN delay information as pseudo distance information. The control unit 13 may specify a core network closest to the designated core network from the distance information.

In addition, by registering the latitude and longitude of the CN in the storage destination information 12a, the control unit 13 may specify the core network closest to the designated core network using a distance on a map which is not accurate.

In this way, by copying the subscriber information of the designated subscriber from the HSS of the closest core network to the HSS of the designated core network, congestion of the entire network can be reduced. In addition, it is possible to shorten a section of a network in which important information such as subscriber information is transmitted, and it is possible to reduce an opportunity to receive a security attack.

<2-3. Operation of Management Apparatus>

Figure 6:
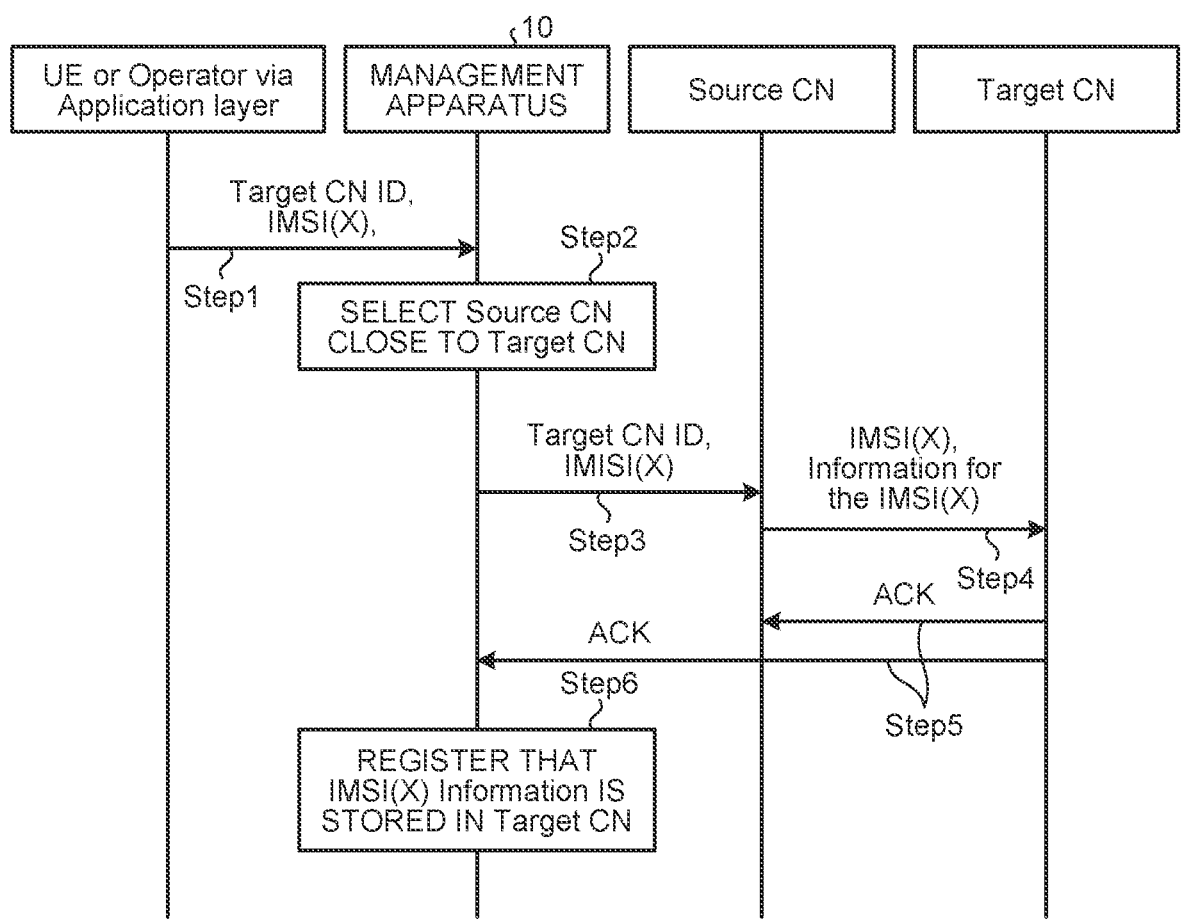
FIG. 6 is a diagram illustrating an example of a flow of an operation of synchronizing subscriber information according to the first embodiment.

Next, an operation of the management apparatus 10 according to the first embodiment will be described. FIG. 6 is a diagram illustrating an example of a flow of an operation of synchronizing subscriber information according to the first embodiment.

The operator or the subscriber designates a subscriber and a core network, and transmits an instruction to copy the subscriber information to the management apparatus 10. For example, the operator or the subscriber requests the management apparatus 10 to copy the subscriber information corresponding to the IMSI(X) by sending the CN ID (Target CN ID) of a target serving as a copy destination, and the IMSI(X) of the subscriber to be copied (Step 1).

In the management apparatus 10, the control unit 13 designates the subscriber and the core network, and receives an instruction to copy the subscriber information. For example, the control unit 13 receives an instruction to copy the subscriber information designating the IMSI(X) and the CN ID. The control unit 13 grasps to which CN (Target CN) the subscriber information of the designated IMSI(X) is to be copied from the designated CN ID. When receiving the copy instruction, the control unit 13 specifies the core network in which the subscriber information of the designated subscriber is stored from the storage destination information 12*a*. The control unit 13 selects a core network close to the Target CN of the copy destination from the specified core networks as the Source CN. For example, the control unit 13 stores subscriber information of the designated IMSI(X), and selects a CN close to the Target CN of the copy destination as the Source CN (Step 2). Here, the Target CN is a CN that is a transmission destination of the subscriber information corresponding to the IMSI and is a CN of a copy destination. The Source CN stores the subscriber information corresponding to the IMSI, is a CN serving as a transmission source of the subscriber information, and is a CN serving as a copy source.

In the management apparatus 10, the control unit 13 instructs the HSS of the core network of the copy source to copy the subscriber information of the designated subscriber to the designated core network. For example, the control unit 13 notifies the selected Source CN of the Target CN ID. In addition, the control unit 13 notifies the Source CN of the IMSI(X) in order to designate which subscriber information is sent from the Target CN to the Source CN (Step 3).

The Source CN specifies the Target CN from the notified Target CN ID, and transmits the notified IMSI(X) and the subscriber information corresponding to the IMSI(X) to the HSS of the Target CN (Step 4). For example, the Source CN transmits information to the Target CN using a protocol such as TCP, UDP, or SCTP. Here, the reason why the IMSI(X) is transmitted together with the subscriber information is that when only the subscriber information is transmitted, the Target CN does not know which subscriber's information it is.

The Target CN notifies the Source CN that the subscriber information has been correctly received, and also notifies the management apparatus 10 of the fact (Step 5).

In the management apparatus 10, the control unit 13 updates the storage destination information 12*a* to the content in which the subscriber information corresponding to the IMSI(X) is stored in the Target CN (Step 6).

Figure 7:
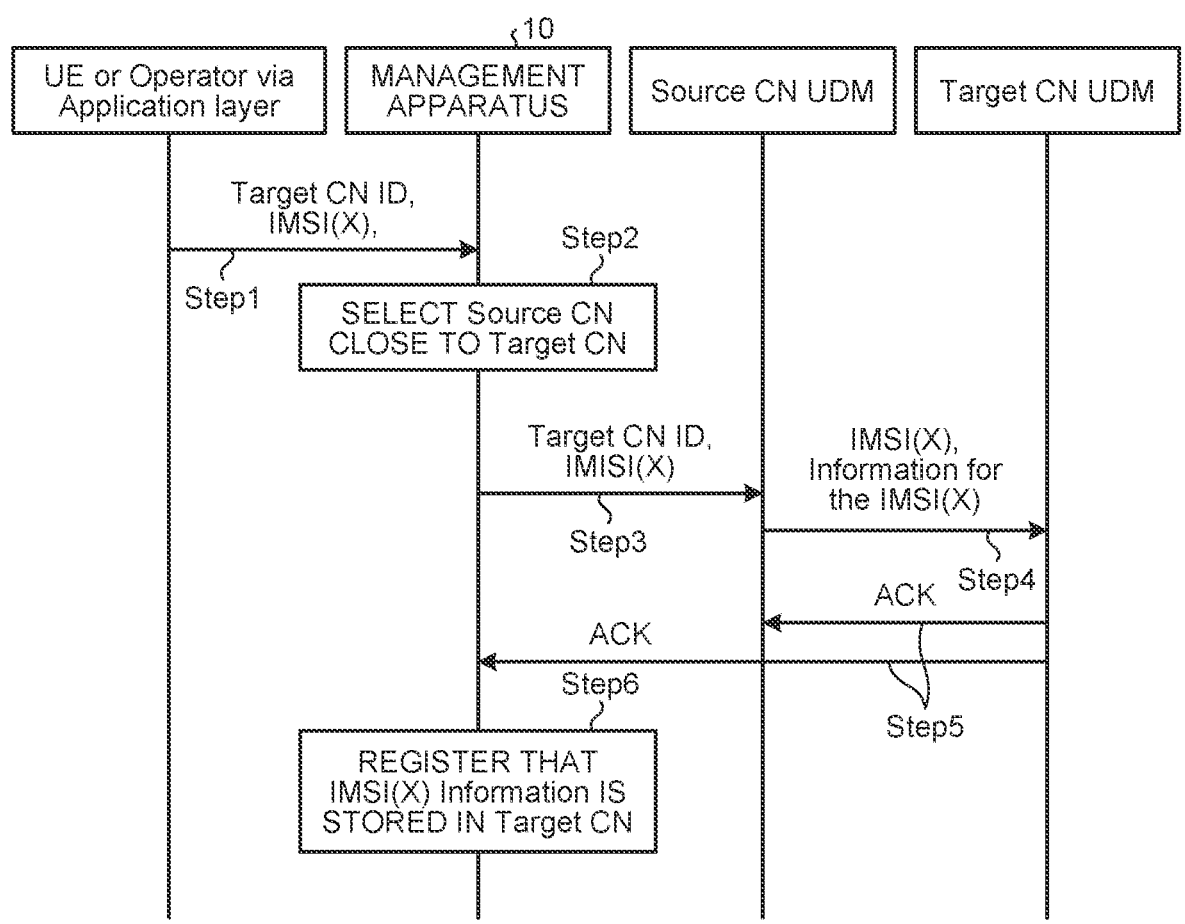
FIG. 7 is a diagram illustrating FIG. 6 with an Entity name of a 5G Core Network.

Note that FIG. 6 illustrates a case where the Entity name of the 4G Core Network is used. FIG. 7 illustrates a case where the procedure illustrated in FIG. 6 uses the Entity name of the 5G Core Network. FIG. 7 is a diagram illustrating FIG. 6 with the Entity name of the 5G Core Network. In FIG. 7, the term UDM is added to Source CN and Target CN.

Figure 8:
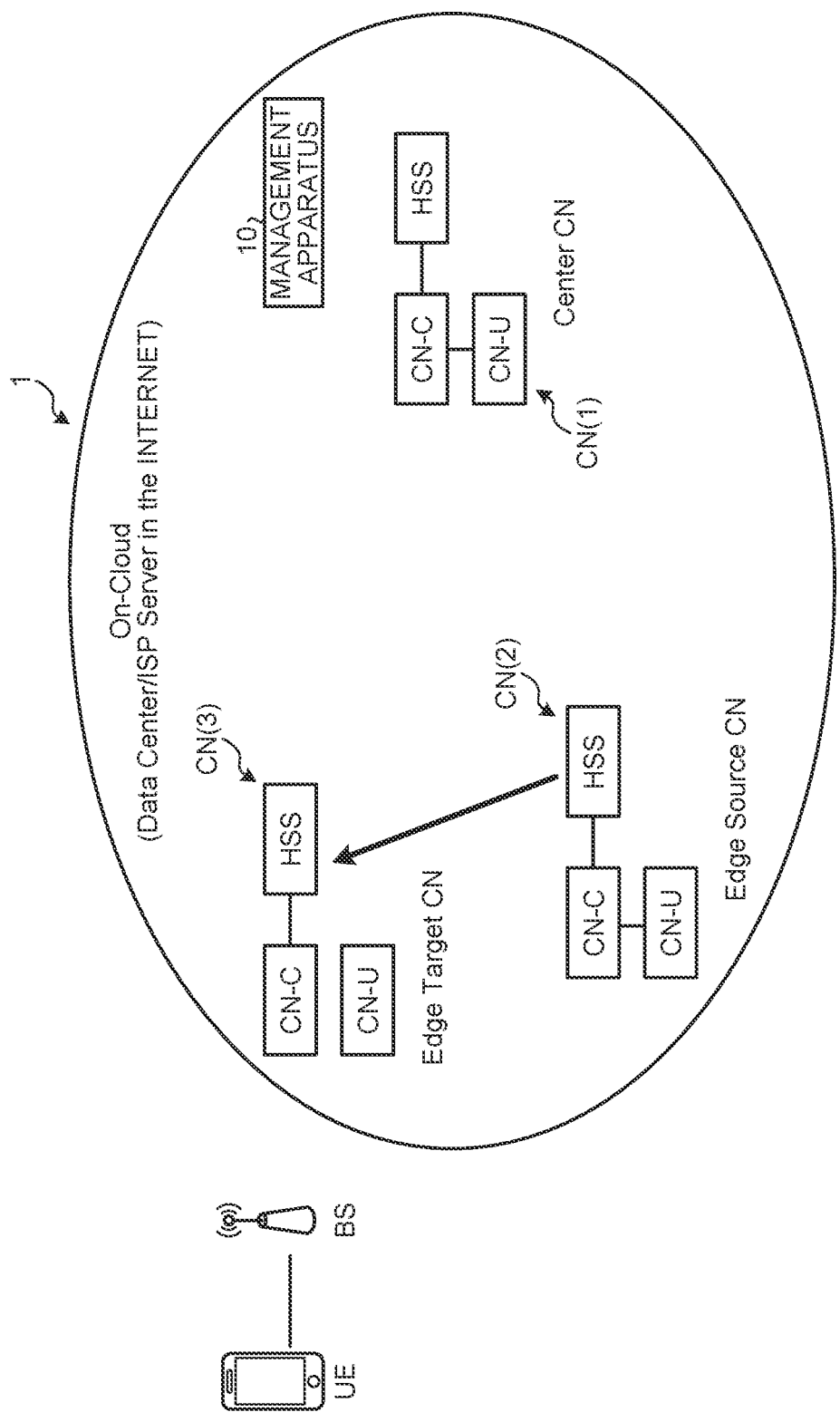
FIG. 8 is a diagram illustrating an example of copying of subscriber information according to the first embodiment.

As a result, the subscriber information corresponding to the IMSI can be added to the HSS of the CN that is Target. FIG. 8 is a diagram illustrating an example of copying of subscriber information according to the first embodiment. In FIG. 8, the cellular network 1 illustrated in FIG. 3 is illustrated. In FIG. 8, the Source CN is CN(2), the Target CN is CN(3), and an arrow indicates that the subscriber information is transmitted from the HSS of the CN(2) to the HSS of the CN(3).

As described above, according to the present embodiment, the management apparatus 10 includes the communication unit 11, the storage unit 12, and the control unit 13. The communication unit 11 can communicate with the plurality of core networks (CNs) provided in the cellular network 1. The storage unit 12 stores, for each subscriber, storage destination information 12*a* indicating a core network in which subscriber information of the subscriber is stored. The control unit 13 designates the subscriber and the core network, and receives an instruction to copy the subscriber information. When receiving the copy instruction, the control unit 13 specifies the core network in which the subscriber information of the designated subscriber is stored from the storage destination information 12*a*. The control unit 13 performs control to copy the subscriber information of the designated subscriber from an HSS of the specified core network to an HSS of the designated core network. As a result, the management apparatus 10 can synchronize the subscriber information with the HSSs of the plurality of core networks. As a result, the management apparatus 10 can realize a distributed subscriber file system that does not require roaming.

Further, the control unit 13 specifies a core network closest to the designated core network from the core network in which the subscriber information of the designated subscriber is stored. The control unit 13 performs control to copy the subscriber information of the designated subscriber from an HSS of the specified core network to an HSS of the designated core network. As a result, the management apparatus 10 can reduce congestion of the entire network. In addition, the management apparatus 10 can shorten a section of the network in which the subscriber information is transmitted, and can reduce a chance of receiving a security attack.

3. Second Embodiment

Next, a second embodiment will be described. Configurations of a cellular network 1 and a management apparatus 10 according to the second embodiment are the same as those of the first embodiment, and thus description thereof is omitted.

Meanwhile, in Step 1 of FIG. 6 described above, the operator or the subscriber instructs the management apparatus 10 to copy the subscriber information. If anyone can give an instruction of this copy, it is possible to give an instruction by impersonation, which is not desirable in terms of security.

Therefore, in the second embodiment, the control unit 13 receives a copy instruction only from a user authenticated by any core network. For example, the control unit 13 recognizes that the instruction for copying is valid only when the operator or the subscriber connects to the network providing the mechanism for copying the HSS and instructs via the network. A user who can attach to the network has an IMSI already registered with an HSS of a CN anywhere in the network. After attaching to the CN, the user instructs the control unit 13 to copy. Since the attached CN is not necessarily near the CN to be copied, it is necessary to instruct the management apparatus 10 to copy.

In this way, only a user whose IMSI is registered in any CN in the system can instruct to copy the IMSI in the HSS.

The control unit 13 determines whether the request is valid by knowing which CN is the source address in the received copy instruction and whether the user who has instructed the copy attaches to the CN.

<3-1. Operation of Management Apparatus 10>

Figure 9:
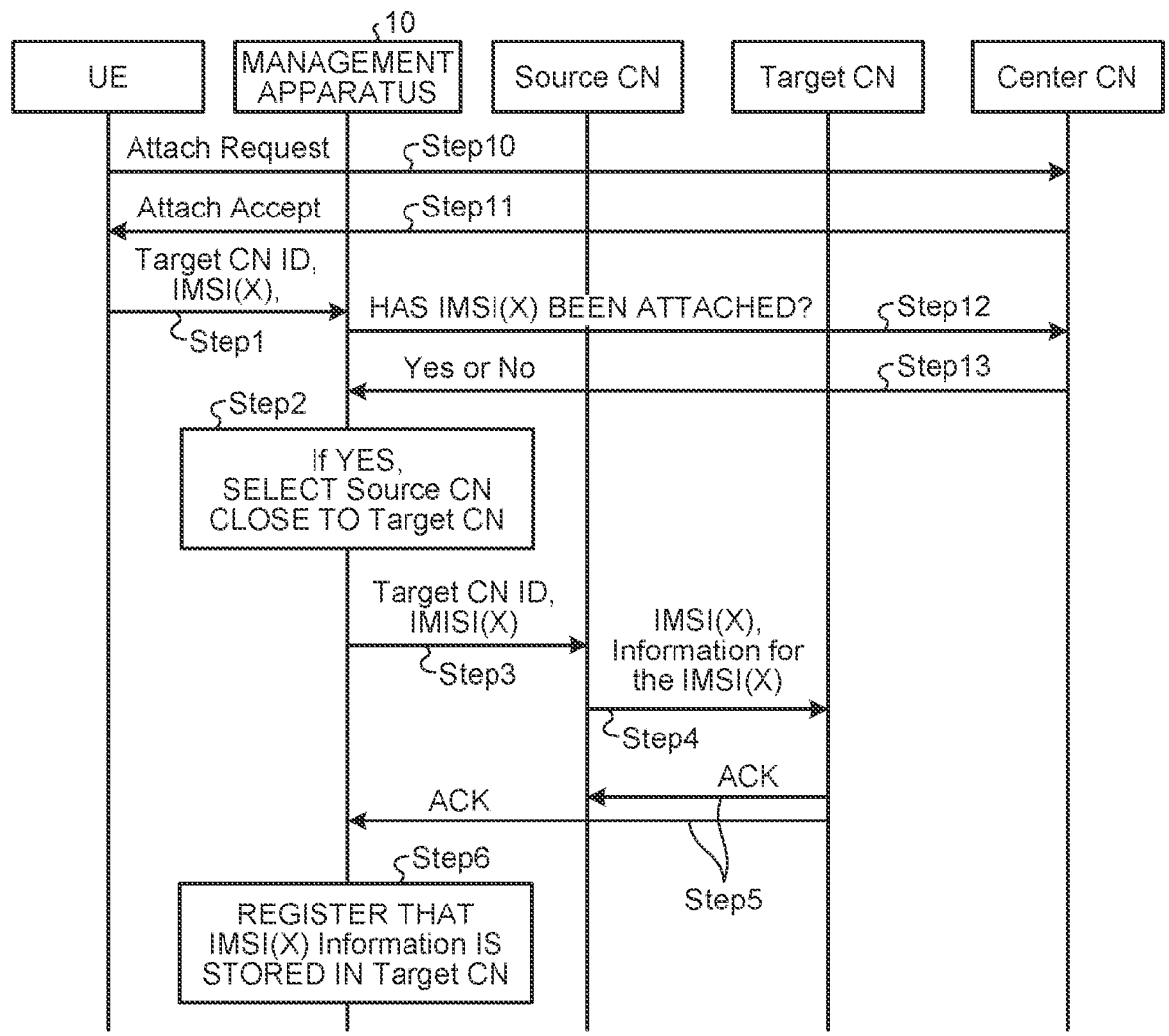
FIG. 9 is a diagram illustrating an example of a flow of an operation of determining validity of a request according to a second embodiment.

Next, an operation of the management apparatus 10 according to the second embodiment will be described. FIG. 9 is a diagram illustrating an example of a flow of an operation of determining validity of a request according to the second embodiment. Steps 1 to 6 in FIG. 9 are the same as those in FIG. 6, and thus a part of description thereof will be omitted.

The operator or the subscriber requests Attach from the Center CN in order to operate the terminal to connect to the cellular network 1 (Step 10). The Center CN checks whether the terminal is qualified to connect, and if it can be authenticated, performs settings to allow Attach and enable communication between the terminal and the base station (Step 11).

The operator or the subscriber operates the terminal to designate the subscriber and the core network, and transmit an instruction to copy the subscriber information to the management apparatus 10 (Step 1).

Upon receiving the copy instruction, the management apparatus 10 inquires of the Center CN whether the terminal has already been attached to the CN (Step 12). The Center CN replies whether the terminal has been attached (Step 13).

When the terminal is already attached, the management apparatus 10 stores the subscriber information of the designated IMSI and selects a CN close to the Target CN of the copy destination as the Source CN (Step 2).

As a result, since only a request from a reliable user is accepted, it is possible to reject a request from an impersonated third party, and it is possible to reduce the probability that the IMSI and the subscriber information are used by the third party.

As described above, according to the present embodiment, the control unit 13 receives a copy instruction only from a user authenticated by any core network. As a result, the management apparatus 10 can suppress the IMSI and the subscriber information from being copied in response to a copy instruction from an unjust user.

4. Third Embodiment

Next, a third embodiment will be described. A configuration of a cellular network 1 according to the third embodiment is the same as that of the first embodiment, and thus description thereof is omitted.

By the way, it is desirable to dispersedly hold the subscriber information in the CN when it is desired to copy the subscriber information from the neighbor CN. On the other hand, when the subscriber information is excessively distributed and held in the CN, it may be undesirable from the viewpoint of security. For example, a situation in which subscriber information is stored in HSSs of various CNs indefinitely is undesirable.

Therefore, in the third embodiment, setting information of the storage period of the copied subscriber information is further stored in the storage unit 12 for each core network. When the copied subscriber information has passed the storage period of the core network of the copy destination set in the setting information, the control unit 13 performs control to delete the subscriber information from the HSS of the core network of the copy destination.

<4-1. Configuration of Management Apparatus>

Figures 10, 11:
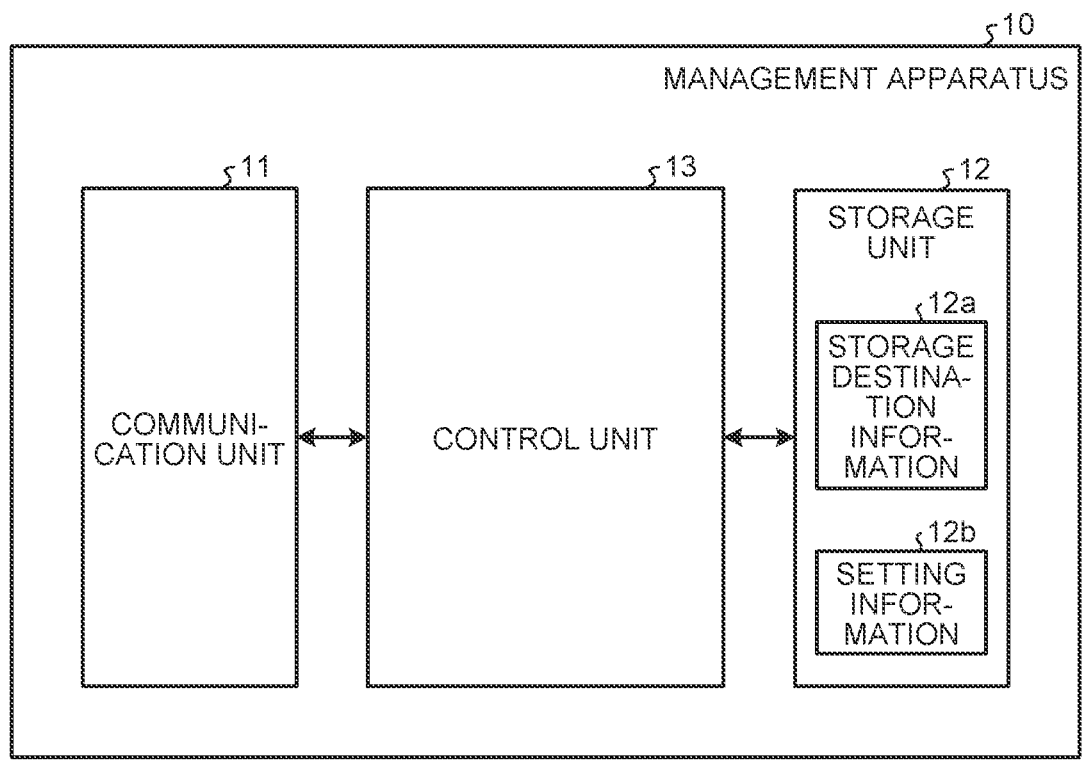
FIG. 10 is a diagram illustrating a configuration example of a management apparatus according to a third embodiment.
FIG. 11 is a diagram illustrating an example of a data configuration of setting information according to the third embodiment.

FIG. 10 is a diagram illustrating a configuration example of the management apparatus 10 according to the third embodiment. Since the management apparatus 10 according to the third embodiment is partially similar to the management apparatus 10 according to the first embodiment illustrated in FIG. 4, the same reference signs are given to similar parts, and the description thereof will be omitted.

The storage unit 12 further stores setting information 12b.

The setting information 12b is data in which the setting of the storage period of the copied subscriber information is stored for each core network.

FIG. 11 is a diagram illustrating an example of a data configuration of the setting information 12b according to the third embodiment. In the setting information 12b, location information of CNs and a Level indicating a storage period are set for each identification information (CN ID) for identifying the core network.

When the Level is "0", the subscriber information is deleted after a certain period of time (for example, X seconds). When the Level is "1", a time (for example, Y seconds) longer than a certain time (for example, X seconds) can be set, and the subscriber information is deleted after the time Y seconds elapses. When the Level is "2", the copied subscriber information is held without being deleted.

The Level of each core network is determined, for example, by an operator managing the management apparatus 10. The operator sets one CN in a certain area to have a CN with a Level "2" set. In addition, Level "1" is set for a CN that can be expected to be used for a long time to some extent. For the other CNs, Level "0" is set, and the subscriber information of subscribers who temporarily used is deleted after X seconds.

When the copied subscriber information has passed the storage period of the core network of the copy destination set in the setting information 12b, the control unit 13 performs control to delete the subscriber information from the HSS of the core network of the copy destination. For example, the control unit 13 reads a value of the Level of the core network of the copy destination from the setting information 12b, and obtains the storage period corresponding to the read value of the Level. In addition, the control unit 13 starts measuring the elapsed time after copying by a timer for each of the copied subscriber information and the core network of the copy destination. For example, the control unit 13 stores date and time of copying for each of the copied subscriber information and the core network of the copy destination, and measures elapsed time from the date and time. When the elapsed period measured by the timer passes the storage period, the control unit 13 instructs the HSS of the core network of the copy destination of the subscriber information to delete the subscriber information. Note that, in a case where the value of the Level is "2", the control unit 13 does not set the timer, and does not delete the subscriber information.

Note that the control unit 13 may count down the storage period with a timer, and when the storage period has elapsed, instruct the HSS of the core network of the copy destination of the subscriber information to delete the subscriber information. Furthermore, the control unit 13 may stop the measurement of the elapsed period during the connection of the terminal of the subscriber to the core network. For example, the control unit 13 may stop the timer and stop the measurement of the elapsed period while the terminal of the subscriber is connected to the Core Network via the base station. The meaning of being connected is a state in which the terminal of the user is given an IP Address from the Core Network, and the Core Network grasps the location of the user terminal at a granularity that the user terminal is located somewhere in a plurality of base stations in a certain region. For example, in the case of the EMM-Registered state, the measurement of the elapsed period by the timer for deleting the subscriber information of the user is resumed. In a case where the user is away from the network for a certain period of time and the user's location is not known, the state becomes EMM-deregistered. The control unit 13 resumes the measurement of the elapsed period by the timer when the connection ends, and deletes the subscriber information of the user from the HSS when the elapsed period has passed the storage period. In the case of 5G, EMM-Registered is referred to as RM-Registered. EMM-Deregistered is referred to as RM-Deregistered.

Furthermore, for example, in a case where there is a request to hold the deletion for one week from the user, the control unit 13 may hold the measurement of the elapsed period by the timer for the deletion for one week.

In addition, the user may explicitly request to delete the subscriber information. When receiving a request to delete the subscriber information by designating the core network from the user, the control unit 13 instructs the HSS of the designated core network to delete the subscriber information of the user.

<4-2. Operation of Management Apparatus 10>

Figure 12:
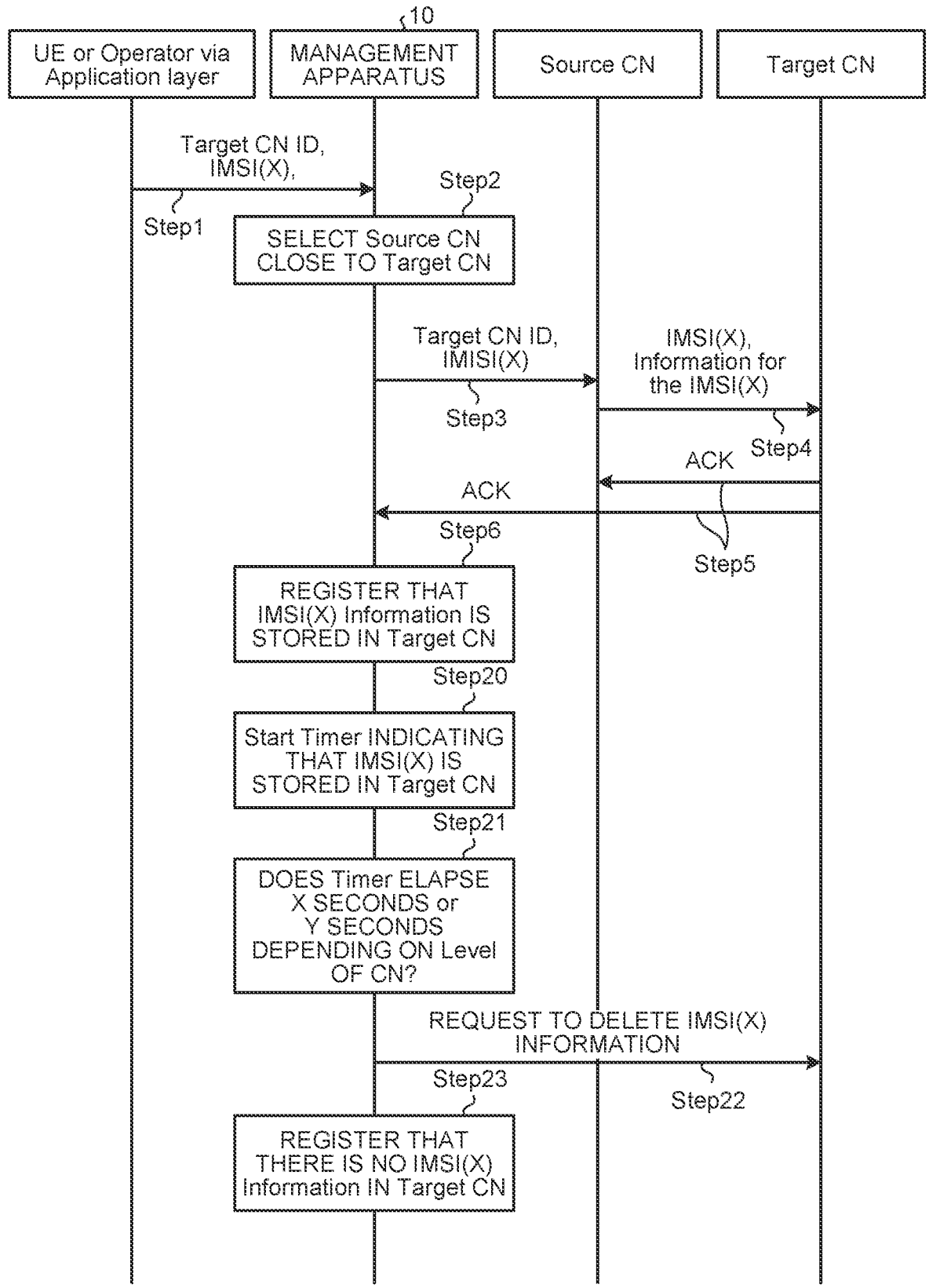
FIG. 12 is a diagram illustrating an example of a flow of an operation of deleting subscriber information according to the third embodiment.
Figure 13:
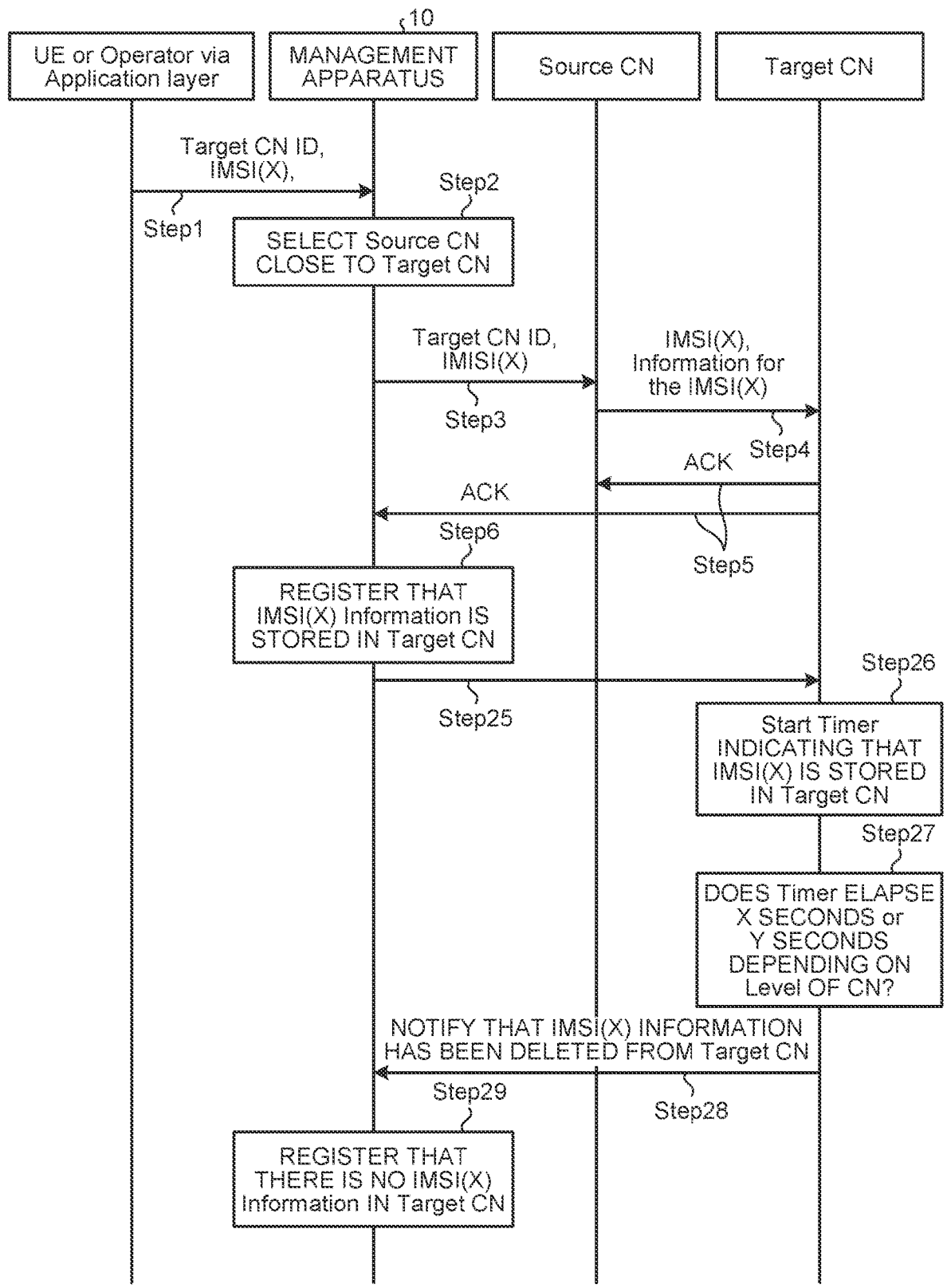
FIG. 13 is a diagram illustrating an example of a flow of an operation of deleting subscriber information according to a third embodiment.

Next, an operation of the management apparatus 10 according to the third embodiment will be described. FIGS. 12 and 13 are diagrams illustrating an example of a flow of an operation of deleting the subscriber information according to the third embodiment. FIG. 12 is a procedure diagram in a case where a counter for measuring the time until deletion is installed in the management apparatus 10. FIG. 13 is a procedure diagram in a case where a counter for measuring the time until deletion is installed in the Target CN. Steps 1 to 6 in FIGS. 12 and 13 are the same as those in FIG. 6, and thus a part of description thereof will be omitted.

In FIG. 12, after Step 6, the control unit 13 of the management apparatus 10 starts measuring an elapsed time after copying by the timer (Step 20). The control unit 13 reads the value of the Level of the core network (Target CN) of the copy destination from the setting information 12*b*, and obtains a storage period corresponding to the read value of the Level. Then, the control unit 13 determines whether the elapsed period measured by the timer has elapsed from the storage period (Step 21). When the elapsed period has passed the storage period, the control unit 13 instructs the HSS of the core network (Target CN) as the copy destination of the subscriber information to delete the subscriber information for which the storage period has passed (Step 22). In the Target CN, the instructed subscriber information is deleted.

The control unit 13 updates the storage destination information 12*a* to the content in which the subscriber information is deleted from the core network of the copy destination (Step 23).

On the other hand, in FIG. 13, after Step 6, the control unit 13 of the management apparatus 10 obtains the storage period of the copied subscriber information, and notifies the core network of the copy destination of the storage period (Step 25). For example, the control unit 13 reads the value of the Level of the Target CN from the setting information 12*b*, and notifies the Target CN of the storage period corresponding to the read value of the Level.

The Target CN starts measuring an elapsed time after copying by a timer (Step 26). The Target CN determines whether the elapsed period measured by the timer has elapsed from the storage period (Step 27). When the elapsed period has passed the storage period, the Target CN deletes the copied subscriber information, and notifies the management apparatus 10 that the subscriber information has been deleted (Step 28).

The control unit 13 updates the storage destination information 12*a* to the content in which the subscriber information is deleted from the core network of the copy destination (Step 29).

As described above, according to the present embodiment, the storage unit 12 further stores the setting information 12*b* of the storage period of the copied subscriber information for each core network. When the storage period of the core network of the copy destination set in the setting information 12*b* elapses after the subscriber information is copied, the control unit 13 performs control to delete the subscriber information from the HSS of the core network of the copy destination. As a result, since the management apparatus 10 can suppress the subscriber information from being excessively dispersed and held in the CN, it is possible to reduce the probability of leakage of the subscriber information. In addition, if the value of the Level of one CN is set to be high in a region, the subscriber information can be permanently left in an appropriate CN as the Source CN.

In addition, the control unit 13 stops the measurement of the elapsed period during the connection of the terminal of the subscriber to the core network. As a result, the management apparatus 10 can suppress early deletion of the subscriber information of the terminal connected to the core network.

5. Fourth Embodiment

Next, a fourth embodiment will be described. Configurations of a cellular network 1 and a management apparatus 10 according to the fourth embodiment are the same as those of the first embodiment, and thus description thereof is omitted.

Incidentally, the IMSI should not be easily intercepted by an eavesdropper or the like from the viewpoint of confidentiality. In the method of the first embodiment, the IMSI is often used on a transmission path. Specifically, in Step 4, the IMSI and the subscriber information are transmitted in a set. It is important from the viewpoint of Security that these communications are usually performed in an encrypted manner, but the IMSI itself is not sent much.

Therefore, in the fourth embodiment, the copy of the subscriber information is realized by using identification information as a substitute for the IMSI.

<5-1. Configuration of Management Apparatus>

FIG. 14 is a diagram illustrating an example of a data configuration of storage destination information 12*a* according to the fourth embodiment. The storage destination information 12a stores a core network in which, for each subscriber, subscriber information of the subscriber is stored. In addition, the storage destination information 12a stores, for each subscriber, a subscriber number of the subscriber and a first identification code for identifying the subscriber. For example, in the storage destination information 12a, ID1 is stored as the first identification code for each IMSI for identifying the subscriber. In the case of FIG. 14, IMSI"1" is associated with ID1"Y". IMSI"2" is associated with ID1"X". IMSI3 is associated with ID1"Z".

<5-2. Operation of Management Apparatus>

Figure 15:
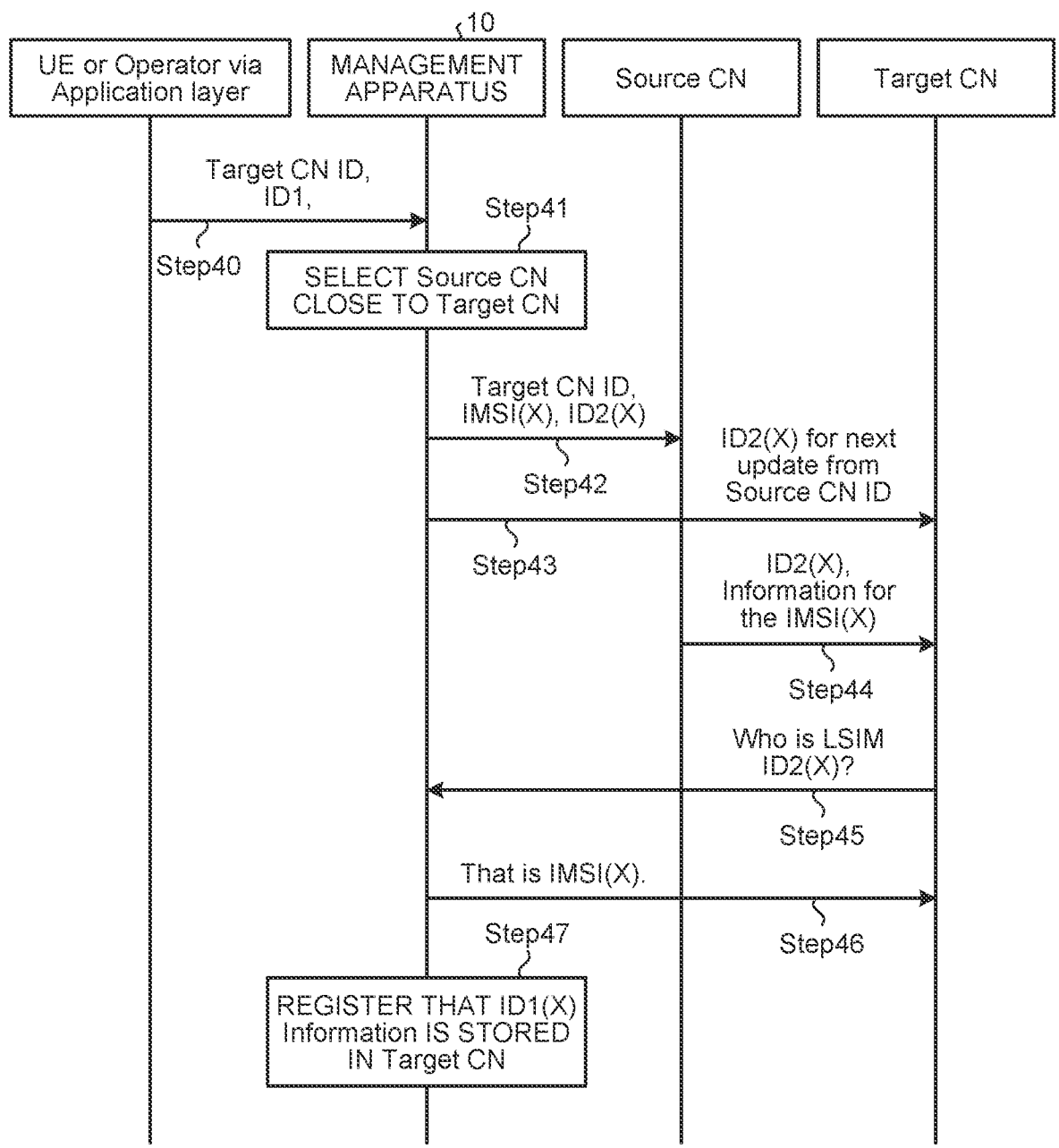
FIG. 15 is a diagram illustrating an example of a flow of an operation of synchronizing subscriber information according to the fourth embodiment.

Next, an operation of the management apparatus 10 according to the first embodiment will be described. FIG. 15 is a diagram illustrating an example of a flow of an operation of synchronizing subscriber information according to the fourth embodiment.

The operator or the subscriber designates a subscriber and a core network, and transmits an instruction to copy the subscriber information to the management apparatus 10. For example, an operator or a subscriber requests a copy of the subscriber information corresponding to ID1(X) by transmitting ID1(X) of the subscriber to be copied and the identification information (CN ID) of an CN of a copy destination to the management apparatus 10 (Step 40).

In the management apparatus 10, the control unit 13 designates the first identification code and the core network, and receives an instruction to copy the subscriber information. For example, the control unit 13 receives an instruction to copy the subscriber information designating not the IMSI but the ID1(X) and the CN ID. The control unit 13 grasps, from the designated CN ID, to which CN (Target CN) the subscriber information with the designated ID1(X) is to be copied. The control unit 13 specifies the core networks in which the subscriber information of the subscriber corresponding to the designated first identification code is stored from the storage destination information 12a. The control unit 13 selects a core network close to the Target CN of the copy destination from the specified core networks as the Source CN. For example, the control unit 13 stores the subscriber information with the designated ID1(X) and selects a CN close to the Target CN of the copy destination as the Source CN (Step 41).

In the management apparatus 10, the control unit 13 determines a new second identification code in correspondence with the subscriber information. The control unit 13 designates the designated subscriber, the second identification code, and the designated core network to instruct the HSS of the core network of the copy source to copy the subscriber information. For example, the control unit 13 notifies the selected Source CN of the CN ID of the Target CN. In addition, the control unit 13 newly assigns ID2(X) used when the subscriber information is transmitted as a new second identification code corresponding to the subscriber information of the designated subscriber. Then, in order to designate which subscriber information is transmitted from the Target CN to the Source CN, the control unit 13 notifies the Source CN of the IMSI(X) corresponding to the designated ID1(X) and the newly assigned ID2(X) (Step 42).

In addition, in the management apparatus 10, the control unit 13 notifies the Target CN that the ID2(X) is assigned when the subscriber information is transmitted from the CN with the Source CN ID (Step 43).

Here, the reason why the ID2(X) is transmitted to the Target CN and the Source CN instead of the ID1(X) is that, since the UE or the operator transmits the ID1(X) to the management apparatus 10 once, when the ID1(X) is transmitted, the subscriber information can be specified in a case where the eavesdropping is performed.

The Source CN transmits subscriber information corresponding to the notified IMSI(X) and the ID2(X) to the HSS of the notified Target CN (Step 44).

Here, by sending ID2(X) different from the ID(X) from the Source CN to the Target CN together with the subscriber information, it is possible to make it difficult to understand who the subscriber information is even if only that part is intercepted. In addition, the ID2(X) is also sent together because when only the subscriber information is transmitted, the Target CN does not know which subscriber's information it is. In addition, the reason why the IMSI is not transmitted together with the subscriber information is that, when the transmission of the subscriber information and the IMSI is intercepted, the subscriber information and the IMSI are leaked in a set, which is not desirable in terms of security.

The Target CN notifies the Source CN that the subscriber information has been correctly received, and also notifies the management apparatus 10. When notifying the management apparatus 10, the Target CN inquires what the IMSI of the ID2(X) is (Step 45).

In the management apparatus 10, the control unit 13 notifies the Target CN of the IMSI corresponding to the ID2(X) (Step 46). The Target CN stores the IMSI in correspondence with the subscriber information obtained from the Source CN.

In the management apparatus 10, the control unit 13 updates the storage destination information 12a to the content in which the subscriber information corresponding to the ID1(X) is stored in the Target CN (Step 47).

As described above, the subscriber information corresponding to the ID1(X) can be added to the HSS of the CN that is the Target.

As described above, according to the present embodiment, the storage destination information 12a stores, for each subscriber, the subscriber number of the subscriber and the first identification code (ID1) for identifying the subscriber. The control unit 13 designates the first identification code and the core network, and receives an instruction to copy the subscriber information. When receiving the copy instruction, the control unit 13 specifies the core network in which the subscriber information of the subscriber corresponding to the designated first identification code is stored from the storage destination information 12a. The control unit 13 determines a new second identification code (ID2) corresponding to the subscriber information. The control unit 13 designates the subscriber corresponding to the first identification code, the second identification code, and the designated core network for the HSS of the specified core network, and instructs the copy of the subscriber information. When the second identification code is notified from the designated core network, the control unit 13 notifies the designated core network of the subscriber number (IMSI) corresponding to the second identification code. As a result, since the management apparatus 10 can prevent the subscriber number and the subscriber information from being transmitted simultaneously, it is possible to prevent the correspondence between the subscriber number and the subscriber from being leaked to a third party.

6. Modification Example

The above-described embodiments are examples, and various modifications and applications are possible. In addition, the above-described embodiments can be appropriately combined within a range in which the processing contents do not contradict each other.

In addition, a program for executing the above-described operations is stored and distributed in a computer-readable recording medium such as an optical disk, a semiconductor memory, a magnetic tape, or a flexible disk. Then, for example, the program is installed in a computer, and the above-described processing is executed to configure a control device. At this time, the control device may be a device (for example, a personal computer) outside the management apparatus 10. Furthermore, the control device may be a device (for example, the control unit 13) inside the management apparatus 10.

In addition, the program may be stored in a disk device included in a server device on a network such as the Internet so that the program can be downloaded to a computer. In addition, the above-described functions may be realized by cooperation of an operating system (OS) and application software. In this case, a portion other than the OS may be stored in a medium and distributed, or a portion other than the OS may be stored in a server device and downloaded to a computer.

Among the processes described in the above embodiments, all or a part of the processes described as being performed automatically can be performed manually, or all or a part of the processes described as being performed manually can be performed automatically by a known method. In addition, the processing procedure, specific name, and information including various data and parameters illustrated in the document and the drawings can be arbitrarily changed unless otherwise specified. For example, the various information illustrated in each figure are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

In addition, the above-described embodiments can be appropriately combined in a region in which the processing contents do not contradict each other. Furthermore, the order of each step illustrated in the flowchart and the sequence diagram of the above-described embodiments can be changed as appropriate.

Furthermore, for example, the present embodiments can be implemented as any configuration constituting an apparatus or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

Note that, in the present embodiments, the system means a set of a plurality of components (devices, modules (parts), etc.), and it does not matter whether or not all the components are in the same housing. Therefore, a plurality of devices housed in separate housings and connected via a network, and one device in which a plurality of modules is housed in one housing are both systems.

Furthermore, for example, the present embodiments can adopt a configuration of cloud computing in which one function is shared and processed by a plurality of devices in cooperation via a network.

Although the embodiments of the present disclosure have been described above, the technical scope of the present disclosure is not limited to the above-described embodiments as it is, and various modifications can be made without departing from the gist of the present disclosure. In addition, components of different embodiments and modification examples may be appropriately combined.

Furthermore, the effects described in the present specification are merely examples and are not limited, and other effects may be provided.

Note that the present technique can also have configurations below.

REFERENCE SIGNS LIST

1 CELLULAR NETWORK
10 MANAGEMENT APPARATUS
11 COMMUNICATION UNIT
12 STORAGE UNIT
12a STORAGE DESTINATION INFORMATION
12b SETTING INFORMATION
13 CONTROL UNIT

The invention claimed is:

1. A management apparatus, comprising:
a communication unit configured to communicate with a plurality of core networks in a cellular network;
a storage unit configured to store as a list, for each subscriber of a plurality of subscribers in each core network of the plurality of core networks, storage destination information which indicates at least one core network of the plurality of core networks in which subscriber information of the each subscriber of the plurality of subscribers is stored; and
a control unit configured to:
receive an instruction, from a first subscriber of the plurality of subscribers or an operator of the plurality of core networks, to copy the subscriber information with the first subscriber and a first core network of the plurality of core networks,
specify a second core network of the plurality of core networks in which the subscriber information of the first subscriber is stored from the storage destination information, wherein the specified second core network is closest to the first core network, p2 control to copy the subscriber information of the first subscriber from a home subscriber system (HSS) of the specified second core network to an HSS of the first core network, and
update the storage destination information to a content in which the copied subscriber information is stored in the first core network, wherein
the control unit is further configured to receive the instruction to copy from a user authenticated by at least one core network of the plurality of core networks.

2. The management apparatus according to claim 1, wherein
the storage unit is further configured to store setting information of a storage period of the copied subscriber information for each of the plurality of core networks, and
based on a determination that the storage period of the first core network of a copy destination set in the setting information elapses after the subscriber information is copied, the control unit is further configured to delete the subscriber information from the HSS of the first core network of the copy destination.

3. The management apparatus according to claim 2, wherein the control unit is further configured to stop measurement of an elapsed period based on connection of a terminal of the first subscriber to the first core network.

4. The management apparatus according to claim 1, wherein
the storage destination information stores, for the each subscriber, a subscriber number and a first identification code for identification of the each subscriber, and
the control unit is further configured to:
designate the first identification code and the first core network to receive the instruction to copy the subscriber information,
specify the second core network in which the subscriber information of the first subscriber which corresponds to the designated first identification code is stored from the storage destination information,
define a second identification code which corresponds to the subscriber information,
designate the first subscriber which corresponds to the first identification code, the second identification code, and the designated first core network to instruct to copy the subscriber information to the HSS of the specified second core network, wherein the designated first subscriber corresponds to a second subscriber of the plurality of subscribers, and
notify the designated first core network of the subscriber number which corresponds to the second identification code, wherein the notification is based on a determination that the second identification code is notified from the designated first core network.

5. A subscriber information synchronization method, comprising:
communicating with a plurality of core networks in a cellular network;
storing as a list, for each subscriber of a plurality of subscribers in each core network of the plurality of core networks, storage destination information which indicates at least one core network of the plurality of core networks in which subscriber information of the each subscriber of the plurality of subscribers is stored;
receiving an instruction, from a first subscriber of the plurality of subscribers or an operator of the plurality of core networks, to copy the subscriber information with the first subscriber and a first core network of the plurality of core networks;
specifying a second core network of the plurality of core networks in which the subscriber information of the first subscriber is stored from the storage destination information, wherein the second core network is closest to the first core network;
controlling to copy the subscriber information of the first subscriber from a home subscriber system (HSS) of the specified second core network to an HSS of the first core network; and
updating the storage destination information to a content in which the copied subscriber information is stored in the first core network, wherein
the control unit is further configured to receive the instruction to copy from a user authenticated by at least one core network of the plurality of core networks.

6. The management apparatus according to claim 1, wherein
the storage destination information is stored for each International Mobile Subscriber Identity (IMSI).

7. The management apparatus according to claim 4, wherein
the control unit is further configured to notify, to the specified second core network, a storage destination corresponding to the designated first core network.

* * * * *